(12) United States Patent
Karimi Aqdam et al.

(10) Patent No.: US 8,820,027 B2
(45) Date of Patent: Sep. 2, 2014

(54) MINERAL COMPOSITE PANEL AND ITS PRODUCTION PROCESS

(71) Applicants: Dawood Karimi Aqdam, Tehran (IR); Behzad Aqa Mohammadi, Tehran (IR)

(72) Inventors: Dawood Karimi Aqdam, Tehran (IR); Behzad Aqa Mohammadi, Tehran (IR)

(73) Assignee: Easywall Holding FZE

( * ) Notice: Subject to any disclaimer, the term of this patent is extended or adjusted under 35 U.S.C. 154(b) by 0 days.

(21) Appl. No.: 14/226,292

(22) Filed: Mar. 26, 2014

(65) Prior Publication Data
US 2014/0197568 A1 Jul. 17, 2014

Related U.S. Application Data

(63) Continuation-in-part of application No. 13/625,252, filed on Sep. 24, 2012.

(51) Int. Cl.
*E04B 1/00* (2006.01)
*B29D 99/00* (2010.01)
*B29C 39/10* (2006.01)

(52) U.S. Cl.
CPC ............ *B29D 99/0021* (2013.01); *B29C 39/10* (2013.01)
USPC ....................................... 52/742.1

(58) Field of Classification Search
CPC ............ E04B 5/04; E04B 5/026; E04B 5/02; E04B 5/16; E04B 5/38; E04B 5/40
USPC .................. 52/742.1, 742.12, 742.13, 742.14
See application file for complete search history.

(56) References Cited

U.S. PATENT DOCUMENTS

| | | | | |
|---|---|---|---|---|
| 1,925,460 A * | 9/1933 | Pegram | ......................... | 264/138 |
| 4,469,656 A * | 9/1984 | Ishii | ................................ | 264/87 |
| 5,080,022 A * | 1/1992 | Carlson | ......................... | 106/698 |
| 5,174,819 A * | 12/1992 | Carlson | ......................... | 106/698 |
| 5,221,386 A * | 6/1993 | Ensminger et al. | ............. | 156/40 |
| 7,836,660 B2 * | 11/2010 | Gharibeh et al. | .......... | 52/745.01 |
| 8,182,652 B2 * | 5/2012 | Englert et al. | ................ | 162/129 |
| 2002/0069602 A1 * | 6/2002 | Blanchet | ......................... | 52/600 |
| 2009/0293419 A1 * | 12/2009 | Gharibeh et al. | ............ | 52/782.1 |

* cited by examiner

*Primary Examiner* — Mark Wendell
(74) *Attorney, Agent, or Firm* — Barry Choobin; Patent 360 LLC

(57) ABSTRACT

The embodiments herein provide a prefabricated mineral composite panel and a method for producing the same for constructing the internal walls, the lateral walls and the corner walls in a building. The method comprising the steps of: preparing and assembling a cast, fixing a mesh in the cast, pouring a prefabricated mineral composite into the cast, smoothening and flattening a top surface of the cast, disassembling the cast to withdraw a semi-dried prefabricated mineral composite panel, placing the semi-dried prefabricated mineral composite panel in a drying room for drying the prefabricated mineral composite, removing the dried prefabricated mineral composite panel from the drying room and packaging the prefabricated mineral composite panel.

7 Claims, 12 Drawing Sheets

MINERAL COMPOSITE PANEL AND ITS PRODUCTION PROCESS

CROSS-REFERENCE TO RELATED APPLICATION

This application is a continuation-in-part of the application with Ser. No. 13/625,252 filed on Sep. 24, 2012 and entitled, "A MINERAL COMPOSITE PANEL AND ITS PRODUCTION PROCESS". This application claims the benefit of the abovementioned application and the contents of which are incorporated in entirety as reference herein.

BACKGROUND

1. Technical Field

The embodiments herein generally relate to a building and construction industry and particularly relate to a partition wall inside the buildings. The embodiments herein more particularly relate to a prefabricated light weight panel for interior and lateral walls in the buildings and a method of fabricating light weight panel. The embodiments herein relate to a light weight and earthquake resistant mineral composite panel for internal walls, lateral walls and corner walls in the buildings and a method of fabricating the same.

2. Description of the Related Art

Since ancient times, gypsum has been one of the basic materials used in a building construction. A Plaster is made from baking and grinding the gypsum. The Gypsum is a member of the calcium containing construction materials abundantly found in nature and is available in almost all parts of the earth. It ranks fifth in terms of natural occurrence. The Calcium sulfate occurs in two forms in nature.

Gypsum or hydrated calcium sulfate, with the chemical formula $CaSo_4 \cdot 2H_2O$, occurs in nature in the form of spear-shaped crystals, filaments, finely-grained masses (alabaster). Gypsum belongs to the monoclinic crystal system and has a specific gravity of 2.32 and a hardness of 2. Gypsum has low relief and weak birefringence.

Anhydrite or anhydrous calcium sulfate, with the chemical formula $CaSO4$, is orthorhombic and has a specific gravity of 2.89~2.98 and a hardness of 3~3.35. The Anhydrite or anhydrous calcium sulfate has a moderate birefringence and a higher relief.

During the past recent years, blocks of plaster have been manufactured and marketed as a type of prefabricated walls, for serving such purposes as constructing walls and partitions. However, they have not been widely used due to their high weight and non-resistance to earthquake or similar events.

The large-scale and growing need for housing and buildings has made it essential to employ modern methods and materials with the aim of speeding up construction, reducing weight of buildings, increasing life expectancy and strengthening buildings against earthquake more than ever before. The problems such as the longer periods of construction, a short life expectancy, and a high cost of construction require a proper solution such as the scientific use of modern methods and modern building materials to reduce a weight of building and building material, reduce a construction time, enhance the durability of building and building material, and ultimately reduce the construction costs.

Reducing a building weight is one of the modern issues in the construction science and industry and is expanding and advancing day by day. This technology involves the reduction of the final weight of a building by means of employing modern techniques, using new construction materials, optimizing construction methods, and reducing the building weight thereby not only saving costs, time and energy, but also mitigating the damages arising from the natural disasters such as earthquake and minimizes the damages arising largely from the weight of the building. To employ weight reduction (lightening) techniques, the reasons behind the heaviness of buildings, must be properly addressed at first. Once these reasons are identified, efforts should be made to either eliminate or minimize their effect on the final weight of the building.

The lesser the weight of the structure, the lesser the energy absorbed from earthquakes, and thus the seismic effect of the earthquake to the building is reduced. In other words, reducing a weight of (lightening) a building means providing a more safety against earthquakes.

The use of traditional and old construction materials such as bricks not only adds to the magnitude of the dead load of a building but also increases an energy consumption thereby practically wasting energy. Moreover, a low erection speed and a high volume of building rubble arising from the use of such materials are among the other problems arising with the use of such traditional materials.

On the other hand, as the weight of a building increases, the cost price of the building structure also increases thereby ultimately leading to a rise in the cost price of the building. These issues can be considered as part of the numerous problems faced by this market.

One of the prior arts provides a gypsum based panel such as plasterboard. The panels are manufactured by mounting the rigid board materials onto a frame and applying the facing material to the board with a bonding agent. The cited prior art disclosed herein fails to increase the speed of building production. Also, the cost price of constructing the buildings is high.

However, with the use of the present day prior art panels, the cost price for constructing the buildings are high. Also, the structural and building weights are high.

In the view of the foregoing description, there is a need for a prefabricated panel that reduces a structural and building weight. Further, there is a need for a prefabricated panel that controls an energy consumption in the buildings and reduces its wastage. Still further, there is a need for a panel that increases a speed of constructing the internal walls, lateral walls and corner walls in the buildings and thereby reducing a cost price of a construction.

The abovementioned shortcomings, disadvantages and problems are addressed herein and which will be understood by reading and studying the following specification.

OBJECTS OF THE EMBODIMENTS

The primary object of the embodiments herein is to provide a prefabricated mineral composite panel for constructing the internal walls, lateral walls and corner walls in a building.

Another object of the embodiments herein is to provide a method for erecting a prefabricated mineral composite panel.

Yet another object of the embodiments herein is to provide a prefabricated mineral composite panel for constructing the internal walls, the lateral walls and the corner walls in a building thereby reducing a heaviness of the construction materials.

Yet another object of the embodiments herein is to provide a prefabricated mineral composite panel for constructing the internal walls, the lateral walls and the corner walls in a building to reduce the structural and building weights.

Yet another object of the embodiments herein is to provide a prefabricated mineral composite panel for constructing the internal walls, the lateral walls and the corner walls in a building to provide a fire resistant panel.

Yet another object of the embodiments herein is to provide a prefabricated mineral composite panel for constructing the internal walls, the lateral walls and the corner walls in a building to control energy consumption in the building and to prevent wastage of large quantities of energy.

Yet another object of the embodiments herein is to provide a prefabricated mineral composite panel for constructing the internal walls, the lateral walls and the corner walls in a building to prevent a generation of a high volume of building rubble Yet another object of the embodiments herein is to provide a prefabricated mineral composite panel for constructing the internal walls, the lateral walls and the corner walls in a building to increase a speed of a building construction.

Yet another object of the embodiments herein is to provide a prefabricated mineral composite panel for constructing internal walls, the lateral walls and the corner walls in a building to reduce a cost price of the construction Yet another object of the embodiments herein is to provide a prefabricated mineral composite panel for constructing the internal walls, the lateral walls and corner walls in a building to increase a safety of building walls against fire and earthquake.

Yet another object of the embodiments herein is to provide a prefabricated mineral composite panel for constructing the internal walls, the lateral walls and the corner walls in a building to achieve an independent know-how and production technology to eliminate a need for the imports and reliance on the foreign sources Yet another object of the embodiments herein is to provide a prefabricated mineral composite panel for constructing the internal walls, the lateral walls and the corner walls in a building to increase the acoustic impedance thermal resistance factors.

These and other objects and advantages of the embodiments herein will become readily apparent from the following detailed description taken in conjunction with the accompanying drawings.

SUMMARY

The various embodiments herein provide a prefabricated mineral composite panel and a method for producing a prefabricated mineral composite panel for constructing the internal walls, the lateral walls and the corner walls in a building.

According to an embodiment herein, the method comprising the steps of preparing and assembling a cast, fixing a mesh in the cast, pouring a prefabricated mineral composite into the cast, smoothening and flattening a top surface of the cast, disassembling the cast to withdraw a semi-dried prefabricated mineral composite panel, placing the semi-dried prefabricated mineral composite panel in a drying room for drying the prefabricated mineral composite, removing the dried prefabricated mineral composite panel from the drying room and packaging the prefabricated mineral composite panel.

According to an embodiment herein, the method further comprises the steps of placing a plurality of galvanized iron angles perpendicular to a ceiling, spraying water on a prefabricated mineral composite panel, placing a wetted prefabricated mineral composite panel against the galvanized iron angles, placing the galvanized iron angles against the panel for ensuring a proper placement of panel in place, connecting a plurality of panels to one another and applying a mineral adhesive between the panels for fixing the panels to one another firmly.

According to an embodiment herein, a plurality of prefabricated mineral composite panels are fixed together to form an internal wall, a lateral wall and a corner wall in a building.

According to an embodiment herein, the prefabricated mineral composite panel is dried in the drying room at a temperature of 50° Celsius.

According to an embodiment herein, the mesh is a polypropylene plastic mesh or a fiber glass mesh.

According to an embodiment herein, the prefabricated mineral composite for constructing the internal walls and lateral walls in the buildings comprises a plurality of dry materials and a plurality of wet materials.

According to an embodiment herein, the plurality of dry materials comprises an industrial alpha gypsum with a ratio of 15%, an industrial beta gypsum with a ratio of 50%, calcium carbonate with a ratio of 20%, sodium bentonite with a ratio of 4%, perlite with a ratio of 10%, sodium chloride with a ratio of 1% and slender polypropylene fibers with a ratio of 0.05%.

According to an embodiment herein, the plurality of wet materials comprises water with a ratio of 95%, late resin stuck with a ratio of 2% and waterproof resin with a ratio of 3%.

According to an embodiment herein, the plurality of dry materials are mixed together in a dry form to form a mixture of dry materials and the plurality of wet materials are added to the mixture of the dry materials and mixed for a specific period of time.

According to an embodiment herein, the prefabricated mineral composite for constructing the corner wall in the buildings comprises Calcium Sulphate Hemihydrate with a ratio of 70-75%, Calcium Carbonate with a ratio of 10-20%, Perlite with a ratio of 3-8%, Bentonite Sodium with a ratio of 0-3%, Talc with a ratio of 0-2%, Copolymer of Polyvinyl Alcohol with a ratio of 0-0.2%, and Casein with a ratio of 0-0.2.

According to an embodiment herein, the mineral composite are mixed together for a time period of 60 minutes.

The various embodiments herein provide a method for erecting the prefabricated mineral composite panels. The method comprises the steps of placing a plurality of galvanized iron angles perpendicular to a ceiling, spraying water on a prefabricated mineral composite panel, placing a wetted prefabricated mineral composite panel against the galvanized iron angles, placing the galvanized iron angles against the panel for ensuring a proper placement of panel in place, connecting a plurality of panels to one another and applying a mineral adhesive between the panels for fixing the panels to one another firmly.

According to an embodiment herein, the method comprising the steps of preparing and assembling a cast, fixing a mesh in the cast, pouring a prefabricated mineral composite into the cast, smoothening and flattening a top surface of the cast, disassembling the cast to withdraw a semi-dried prefabricated mineral composite panel, placing the semi-dried prefabricated mineral composite panel in a drying room for drying the prefabricated mineral composite, removing the dried prefabricated mineral composite panel from the drying room and packaging the prefabricated mineral composite panel.

According to an embodiment herein, a plurality of prefabricated mineral composite panels are fixed together to form an internal wall and a lateral wall in a building.

According to an embodiment herein, the prefabricated mineral composite panel is dried in the drying room at a temperature of 50° Celsius.

According to an embodiment herein, the mesh is a polypropylene plastic mesh or a fiber glass mesh.

According to an embodiment herein, the prefabricated mineral composite for constructing the internal walls and lateral walls in the buildings comprises a plurality of dry materials and a plurality of wet materials.

According to an embodiment herein, the plurality of dry materials comprises an industrial alpha gypsum with a ratio of 15%, an industrial beta gypsum with a ratio of 50%, calcium carbonate with a ratio of 20%, sodium bentonite with a ratio of 4%, perlite with a ratio of 10%, sodium chloride with a ratio of 1% and slender polypropylene fibers with a ratio of 0.05%.

According to an embodiment herein, the plurality of wet materials comprises water with a ratio of 95%, late resin stuck with a ratio of 2% and waterproof resin with a ratio of 3%.

According to an embodiment herein, the plurality of dry materials are mixed together in a dry form to form a mixture of dry materials and the plurality of wet materials are added to the mixture of the dry materials and mixed for a specific period of time.

According to an embodiment herein, the mineral composite are mixed together for a time period of 60 minutes.

The various embodiments herein provide a method for erecting the prefabricated mineral composite panels. The method comprises the steps of placing a plurality of galvanized iron angles perpendicular to a ceiling, spraying water on a prefabricated mineral composite panel, placing a wetted prefabricated mineral composite panel against the galvanized iron angles, placing the galvanized iron angles against the panel for ensuring a proper placement of panel in place, connecting a plurality of panels to one another and applying a mineral adhesive between the panels for fixing the panels to one another firmly.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1A:
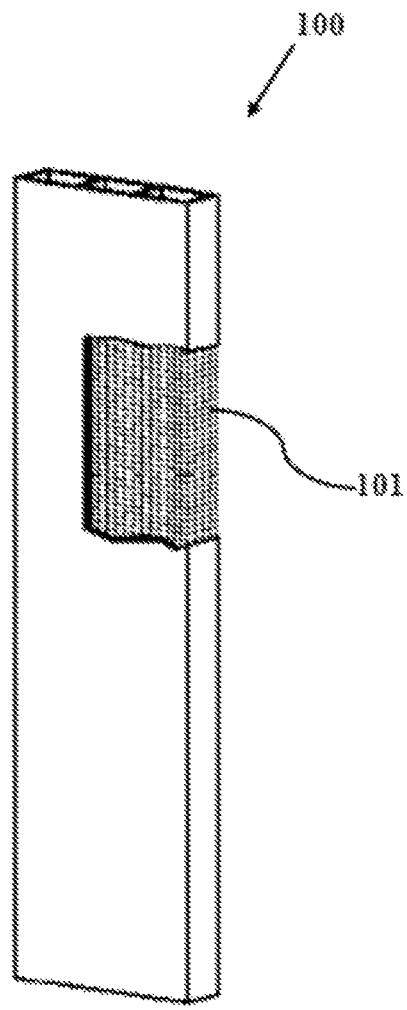
FIG. 1A illustrates a front perspective view of a prefabricated mineral composite panel, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a prefabricated mineral composite panel and a method for producing a prefabricated mineral composite panel for constructing the internal walls, the lateral walls and the corner walls in a building.

According to an embodiment herein, the method comprising the steps of preparing and assembling a cast, fixing a mesh in the cast, pouring a prefabricated mineral composite into the cast, smoothening and flattening a top surface of the cast, disassembling the cast to withdraw a semi-dried prefabricated mineral composite panel, placing the semi-dried prefabricated mineral composite panel in a drying room for drying the prefabricated mineral composite, removing the dried prefabricated mineral composite panel from the drying room and packaging the prefabricated mineral composite panel.

According to an embodiment herein, the method further comprises the steps of placing a plurality of galvanized iron angles perpendicular to a ceiling, spraying water on a prefabricated mineral composite panel, placing a wetted prefabricated mineral composite panel against the galvanized iron angles, placing the galvanized iron angles against the panel for ensuring a proper placement of panel in place, connecting a plurality of panels to one another and applying a mineral adhesive between the panels for fixing the panels to one another firmly.

According to an embodiment herein, a plurality of prefabricated mineral composite panels are fixed together to form an internal wall, a lateral wall and a corner wall in a building.

According to an embodiment herein, the prefabricated mineral composite panel is dried in the drying room at a temperature of 50° Celsius.

According to an embodiment herein, the mesh is a polypropylene plastic mesh or a fiber glass mesh.

According to an embodiment herein, the prefabricated mineral composite for constructing the internal walls and lateral walls in the buildings comprises a plurality of dry materials and a plurality of wet materials.

According to an embodiment herein, the plurality of dry materials comprises an industrial alpha gypsum with a ratio of 15%, an industrial beta gypsum with a ratio of 50%, calcium carbonate with a ratio of 20%, sodium bentonite with a ratio of 4%, perlite with a ratio of 10%, sodium chloride with a ratio of 1% and slender polypropylene fibers with a ratio of 0.05%.

According to an embodiment herein, the plurality of wet materials comprises water with a ratio of 95%, late resin stuck with a ratio of 2% and waterproof resin with a ratio of 3%.

According to an embodiment herein, the plurality of dry materials are mixed together in a dry form to form a mixture of dry materials and the plurality of wet materials are added to the mixture of the dry materials and mixed for a specific period of time.

According to an embodiment herein, the prefabricated mineral composite for constructing the corner wall in the buildings comprises Calcium Sulphate Hemihydrate with a ratio of 70-75%, Calcium Carbonate with a ratio of 10-20%, Perlite with a ratio of 3-8%, Bentonite Sodium with a ratio of 0-3%, Talc with a ratio of 0-2%, Copolymer of Polyvinyl Alcohol with a ratio of 0-0.2%, and Casein with a ratio of 0-0.2.

According to an embodiment herein, the mineral composite are mixed together for a time period of 60 minutes.

According to an embodiment herein, the dimensions and structure of the composite panel with 12 cm thickness panel is as follows. The width (W) of the panel is set as 46 cm. The depth (D) of the panel is set as 12 cm. The height (H) of the panel is set within the range of 270-360 cm. The height of the panel is adjusted flexibly or dynamically in production line and according to the order of the customers, thereby reducing wastes and mineral sources, and increasing the wall installation speed in a project. The thickness of all the flanges and webs in all divisions is set as 1.5 cm. The radius of curvature of all the filets (Curves), r, is set as 15 mm.

According to an embodiment herein, the dimensions and structure of the composite panel with 8 cm thickness panel is as follows. The width (W) of the panel is set as 46 cm. The depth (D) of the panel is set as 8 cm. The height (H) of the panel is set within the range of 270-360 cm. The height of the panel is adjusted flexibly or dynamically in production line and according to the order of the customers, thereby reducing wastes and mineral sources, and increasing the wall installation speed in a project. The thickness of all the flanges and webs in all divisions is set as 1.5 cm. The radius of curvature of all the filets (Curves), r, is set as 15 mm.

According to an embodiment herein, Corner Panel that is being used in corners and angles. According to an embodiment herein, the dimensions and structure of the composite panel for a Corner Panel that is being used in corners and angles. This one is also flexible in height as the other panels of 12 cm and 8 cm thickness panels.

According to an embodiment herein, the prefabricated mineral composite panel for constructing the corner wall in the buildings comprises Calcium Sulphate Hemihydrate with a ratio of 70-75%, Calcium Carbonate with a ratio of 10-20%, Perlite with a ratio of 3-8%, Bentonite Sodium with a ratio of 0-3%, Talc with a ratio of 0-2%, Copolymer of Polyvinyl Alcohol with a ratio of 0-0.2%, and Casein with a ratio of 0-0.2.

The various embodiments herein provide a prefabricated mineral composite panel and a method for producing a prefabricated mineral composite panel for constructing the internal walls and the lateral walls in a building. According to an embodiment herein, the method comprising the steps of preparing and assembling a cast, fixing a mesh in the cast, pouring a prefabricated mineral composite into the cast, smoothening and flattening a top surface of the cast, disassembling the cast to withdraw a semi-dried prefabricated mineral composite panel, placing the semi-dried prefabricated mineral composite panel in a drying room for drying the prefabricated mineral composite, removing the dried prefabricated mineral composite panel from the drying room and packaging the prefabricated mineral composite panel.

According to an embodiment herein, a plurality of prefabricated mineral composite panels are fixed together to form an internal wall and a lateral wall in a building.

According to an embodiment herein, the prefabricated mineral composite panel is dried in the drying room at a temperature of 50° Celsius.

According to an embodiment herein, the mesh is a polypropylene plastic mesh or a fiber glass mesh.

According to an embodiment herein, the prefabricated mineral composite for constructing the internal walls and lateral walls in the buildings comprises a plurality of dry materials and a plurality of wet materials.

According to an embodiment herein, the plurality of dry materials comprises an industrial alpha gypsum with a ratio of 15%, an industrial beta gypsum with a ratio of 50%, calcium carbonate with a ratio of 20%, sodium bentonite with a ratio of 4%, perlite with a ratio of 10%, sodium chloride with a ratio of 1% and slender polypropylene fibers with a ratio of 0.05%.

According to an embodiment herein, the plurality of wet materials comprises water with a ratio of 95%, late resin stuck with a ratio of 2% and waterproof resin with a ratio of 3%.

According to an embodiment herein, the plurality of dry materials are mixed together in a dry form to form a mixture of dry materials and the plurality of wet materials are added to the mixture of the dry materials and mixed for a specific period of time.

According to an embodiment herein, the mineral composite are mixed together for a time period of 60 minutes.

The various embodiments herein provide a method for erecting the prefabricated mineral composite panels. The method comprises the steps of placing a plurality of galvanized iron angles perpendicular to a ceiling, spraying water on a prefabricated mineral composite panel, placing a wetted prefabricated mineral composite panel against the galvanized iron angles, placing the galvanized iron angles against the panel for ensuring a proper placement of panel in place, connecting a plurality of panels to one another and applying a mineral adhesive between the panels for fixing the panels to one another firmly.

According to an embodiment herein, a mineral composite panel or block is a product which has been designed and produced in full conformity to the climatic conditions of the dry and semi-humid geographic regions. In this type of mineral composite panel, the weak properties of the base materials such as a fracture, a weakness toward moisture, and a low compressive resistance and a bending strength are modified.

To achieve this end, carbonate and clay-based compounds as well as an internal mesh are added to the compressive and bending strengths of the original compounds as a result of which the weight of the composite mineral panel is reduced greatly and the compressive and bending strengths of the composite mineral panel is enhanced to a great extent. The acoustic coefficient of the composite mineral panel is quite high and provides good noise and thermal insulation.

Furthermore, the composite mineral panel of the embodiments herein provides other excellent features such as a low weight, a high bending and compressive strengths, use of fibers and internal meshing. The composite mineral panel of the embodiments herein, does in no way lead to a collapse or physical injuries in times of earthquakes. The prefabricated mineral composite panels are fabricated at very reasonable prices compared to other construction materials and provide very high erection speed. In case the use of such prefabricated mineral composite panels forms the basis of structural design from the very beginning of the implementation of a project, the weight of a building can be reduced to great extent, and in turn allowing considerable savings on steel and concrete.

The prefabricated mineral composite panels of the embodiments herein is formed with a mixture comprising the Polypropylene plastic mesh or fiber-glass mesh, the slender polypropylene or fiber-glass fibers up to 30 mm or 20 cm, an industrial alpha gypsum, an industrial beta gypsum, calcium carbonate, sodium bentonite, perlite, salt, reinforcing resin, waterproofing resin and water.

As soon as the mesh is placed in the cast and tied up, the cast is ready for the mixture of composite materials to be poured into the cast. The entire mineral raw materials are mixed together in a dry form at the relevant mixing ratios, and then water is added in proportion to its weight and mixed for a specific period of time as indicated in the production instructions. Then, a dough-like mixture is then poured into the cast and flattened on top. After a specified period of time, the product is removed from the cast and is left free on the pallets in the workshop space so that the mineral composite panel is made to sets-in completely.

Finally, the mineral composite panel is transferred to the drying (baking) furnace so that the composite panel is dehydrated and becomes completely dry after the required time. Once removed from the drier, the mineral composite panel is ready to be forwarded to the construction sites for erection purposes.

These mineral composite panels are erected as follows: A number of punched galvanized iron angles, having the dimensions of 5×5 cm, is fitted on the ceiling (where the wall is going to be erected), and the panels are placed against them. Then, a number of angles is fitted in front of it to ensure it stands in place. The panels are connected to one another by means of a special mineral adhesive. To provide the required hydration between the panels and the special adhesive, the lightweight mineral composite panel of 8 cm or 12 cm is wetted with water prior to adhesive application and installation. Then, adhesive is applied and spread evenly. The next panel (after wetting) is placed exactly beside the first one, and this procedure is continued until the whole wall is completed.

The mineral composite panel is completely waterproof and is resistant to impact, heat and cold. The mineral composite panel is highly lightweight and reduces structural and building weights. The mineral composite panel allows an energy control and efficiency in buildings and reduces energy wastage. The use of mineral composite panel speeds up building construction works. The mineral composite panel enhances the safety of building walls against fire and earthquake. The mineral composite panel increases the acoustic and thermal resistance factors in the building walls.

To better evaluate mineral composite panels, the maximum bending stress on the x axis of the panels (the weakest direction) is calculated by the two types of concentrated and distributed loads.

The Bending formula:

$$\frac{M}{I} = \frac{\sigma_b}{Y} = \frac{E}{R}$$

Where M is the bending moment which causes bending stress,
I is the moment of inertia of the section under stress
σb is the bending stress
E is the distance to the neutral axis
Y is the Young's modulus
R is the radius of the curvature of the member upon bending Given our need for force, only the first two fractions are used to solve the equation.

$$\frac{M}{I} = \frac{\sigma_b}{Y} M = IX \times \sigma b/Y = 4'291.04 \times 63/23.06 = 11'723.14 \text{ kgf/cm}$$

The properties of the mineral composite panel of the embodiments herein are tabulated below.

| | |
|---|---|
| Cross section of whole panel | A = 18'909.4250 mm² = 189.1 cm² |
| Total panel volume having the length of 1 m | V = 18'909'425 mm³ = 18'909.4 cm³ = 18.9 lit |
| Volume of each canal in a length of 1 m | $A_C$ = 12'136.8583 mm² = 121.37 cm² |
| Gyration radius | $V_C$ = 12'136'853.3 mm³ = 12'136.85 cm³ = 12.14 lit |
| Moment of inertia | Axis X = 47.6367 mm |
| | Axis Y = 145.8503 mm |
| Distance of neutral axes to walls | $I_x$ = 42'910'396.5850 mm⁴ = 4'291.04 cm⁴ |
| | $I_y$ = 402'247'201.9804 mm⁴ = 40'224.72 cm⁴ |
| Minimum compressive strength | X = 60 mm = 6 cm |
| | Y = 230.5 mm = 23.06 cm |
| Bending strength | 140 kg/cm² = $_a\sigma$ |
| Weight per unit volume of composite materials of each panel | 63 kg/cm² = $_b\sigma$ |
| Weight per unit length (1 m) of an EasyWall panel | 9.2 × 10⁻⁴ kgf/cm³ |
| Weight per unit area of each panel | 16.375 kgf/m |
| Weight per unit volume of EasyWall mineral-based coating | 35.597 kgf/m² |
| Weight of 1 m² of EasyWall coating with a thickness of 5 mm | 4.6 kgf |
| Weight per unit area of each panel including rendering of one side of coating | 40.2 kgf/m² |

Figure 1B:
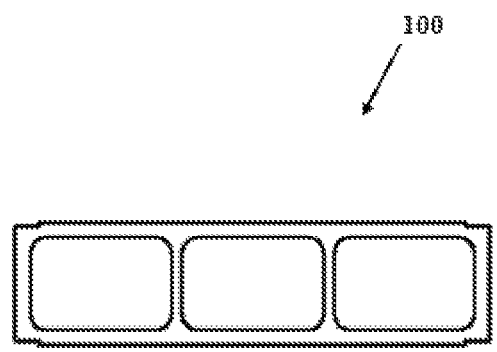
FIG. 1B illustrates a top side view of a prefabricated mineral composite panel, according to an embodiment herein.
Figure 1C:
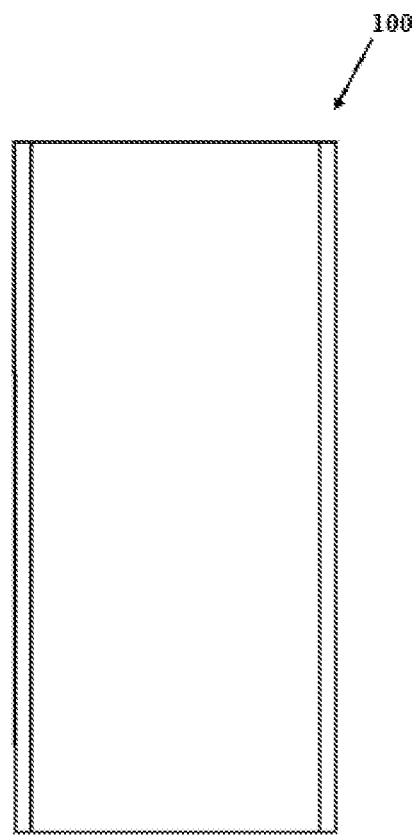
FIG. 1C illustrates a front side view of a prefabricated mineral composite panel, according to an embodiment herein.
Figure 1D:
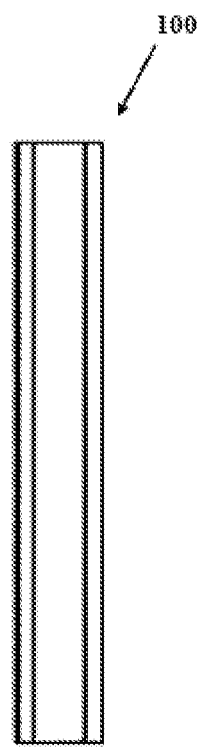
FIG. 1D illustrates a side view of a prefabricated mineral composite panel, according to an embodiment herein.

FIG. 1A illustrates a front perspective view of a prefabricated mineral composite panel, FIG. 1B illustrates a top side view of a prefabricated mineral composite panel, FIG. 1C illustrates a front side view of a prefabricated mineral composite panel and FIG. 1D illustrates a side view of a prefabricated mineral composite panel, according to an embodiment herein. With respect to FIG. 1A-FIG. 1D, a plurality of casts is prepared and is assembled together. A polypropylene plastic mesh or a fiber-glass mesh 101 is fixed internally to the cast.

According to an embodiment herein, the internal mesh 101 is used to reduce the weight of the prefabricated mineral composite panel 100 and to enhance the compressive and building strength of the prefabricated mineral composite panel 100. Also, the prefabricated mineral composite panel 100 does in no way lead to collapse or physical injuries in times of earthquakes due to the use of internal mesh 101.

According to an embodiment herein, a plurality of dry materials is mixed together in a dry form at a relevant mixing ratio for a specific period of time. A plurality of wet materials is added in proportion to the mixture of dry materials and is mixed together for a time period of 60 min. After the time period of 60 min, a dough-like mixture of prefabricated mineral composite comprising a mixture of dry materials and wet materials is obtained. The dough-like mixture is poured into the cast. A top surface of the cast is smoothened and flattened after the prefabricated mineral composite is completely poured into the cast.

According to an embodiment herein, after a time period of 30 min, the cast is disassembled from the semi-dried mineral composite panel 100. The semi-dried mineral composite panel 100 is left free on pallets in a workshop space for a time period of 12 hours, so that the panel 100 sets completely.

According to an embodiment herein, the semi-dried mineral composite panel 100 is placed in a drying room for a time period of 12 hours, so that it dehydrates and becomes dry. The panel 100 is dried at a room temperature of 50° Celsius in the drying room. After the time period of 12 hours, the dried prefabricated mineral composite panel 100 is removed from the drying room. The prefabricated mineral composite panel 100 is packaged and is ready for the erection process.

According to an embodiment herein, the plurality of dry materials comprises about 15% of industrial alpha gypsum, about 50% of industrial beta gypsum, about 20% of calcium carbonate, about 4% of sodium bentonite, about 10% of perlite, about 1% of sodium chloride and 0.05% of slender polypropylene fibers.

According to an embodiment herein, the plurality of wet materials comprises 95% of water, about 2% of late resin stuck and about 3% of waterproof resin.

Figure 2:
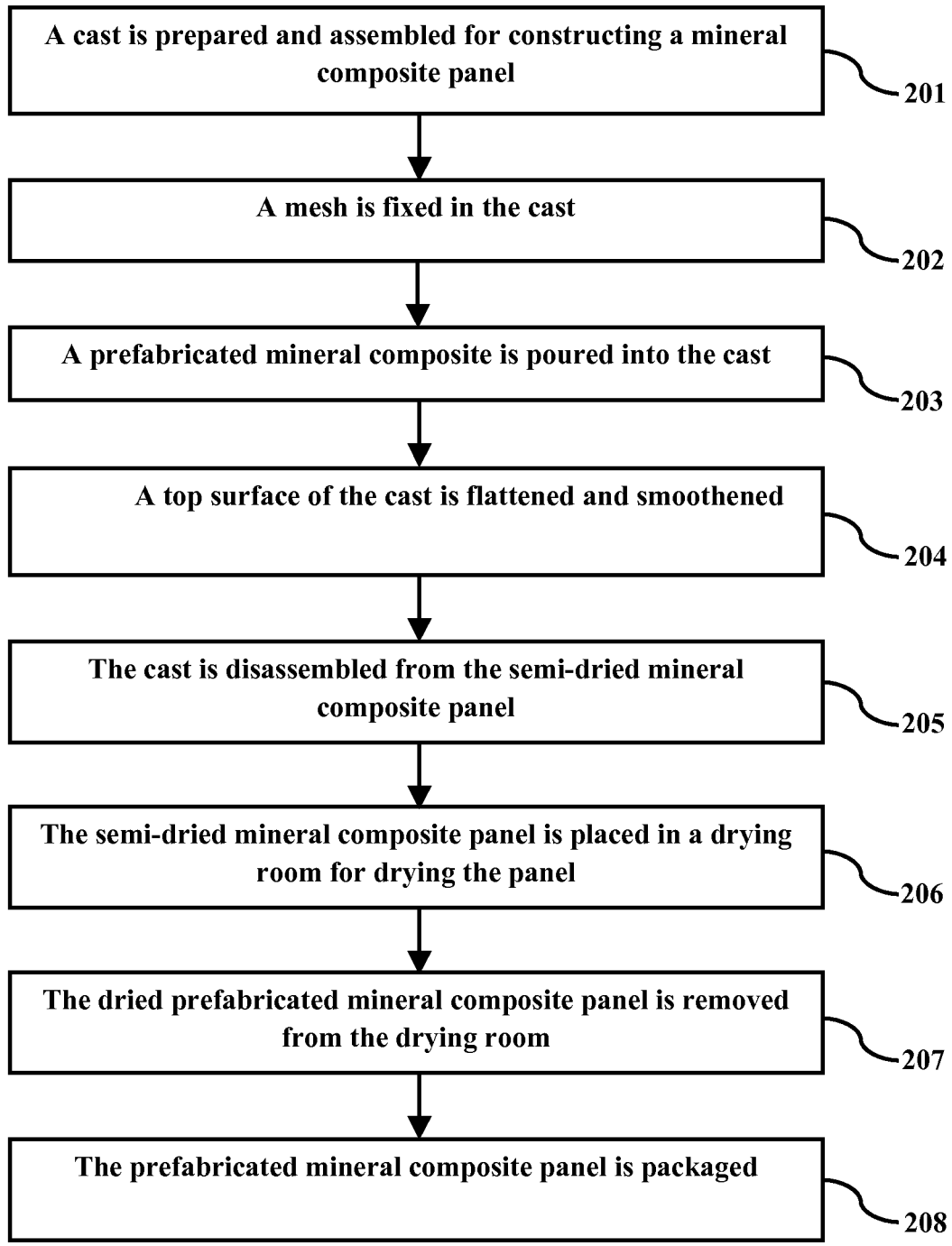
FIG. 2 illustrates a flow chart explaining a method for producing a prefabricated mineral composite panel, according to an embodiment herein.

FIG. 2 illustrates a flow chart explaining a method for producing a prefabricated mineral composite panel, according to an embodiment herein. With respect to FIG. 2, the method for production of prefabricated mineral composite panel for constructing internal walls and lateral walls in a building comprises the steps of: preparing and assembling a cast, fixing a mesh in the cast, poring a prefabricated mineral composite in the cast, smoothing and flattening a top surface of the cast, disassembling the cast to withdraw a semi-dried prefabricated mineral composite panel, placing the semi-dried prefabricated mineral composite panel in a drying room, removing the dried prefabricated mineral composite panel from the drying room and packaging the prefabricated mineral composite panel.

According to an embodiment herein, a plurality of casts is prepared and is assembled together (201). A polypropylene plastic mesh or a fiber-glass mesh is fixed internally to the cast (202). The internal mesh is used to reduce the weight of the mineral composite panel and to enhance the compressive and building strength of the mineral composite panel. A plurality of dry materials is mixed together in a dry form at a relevant mixing ratio for a specific period of time. A plurality of wet materials is added in given proportion to the mixture of dry materials and is mixed together for a time period of 60 min. After the time period of 60 min, a dough-like mixture of prefabricated mineral composite comprising a mixture of dry materials and wet materials is obtained. The dough-like mixture is poured into the cast (203). A top surface of the cast is smoothened and flattened after the prefabricated mineral composite is completely poured into the cast (204). After a time period of 30 min, the cast is disassembled from the semi-dried mineral composite panel (205). The semi-dried mineral composite panel is left free on pallets in a workshop space for a time period of 12 hours, so that the panel sets in completely. The semi-dried mineral composite panel is placed in a drying room for a time period of 12 hours, so that it dehydrates and becomes completely dry (206). The panel is dried at a room temperature of 50° Celsius in the drying room. After the time period of 12 hours, the dried prefabricated mineral composite panel is removed from the drying room (207). The prefabricated mineral composite panel is packaged and is ready for the erection process (208).

Figure 3A:
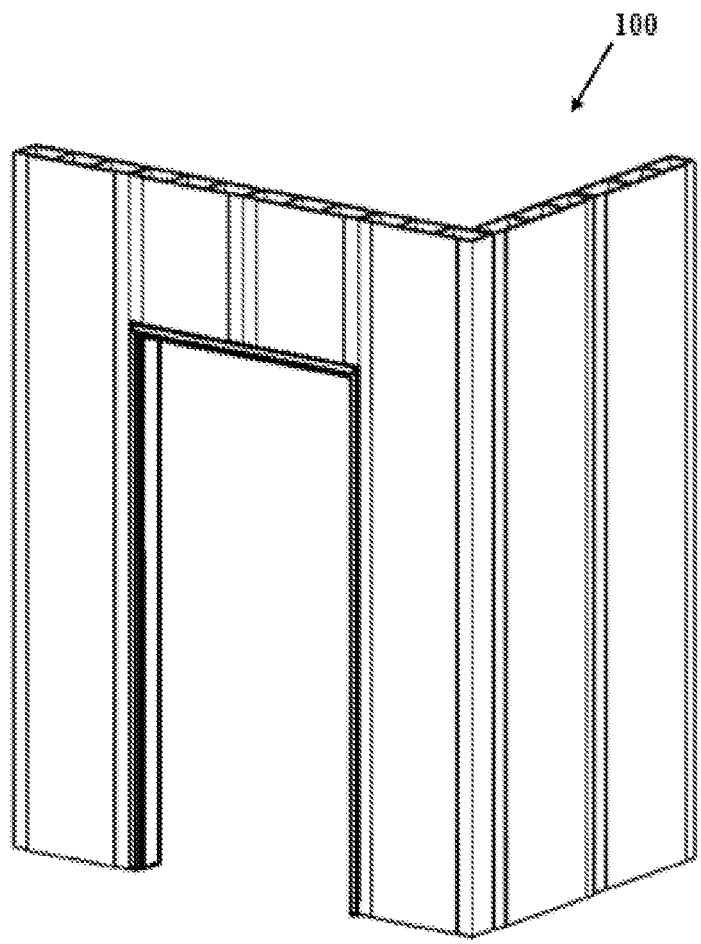
FIG. 3A illustrates a perspective view of a door space erected with a prefabricated mineral composite panel, according to an embodiment herein.
Figure 3B:
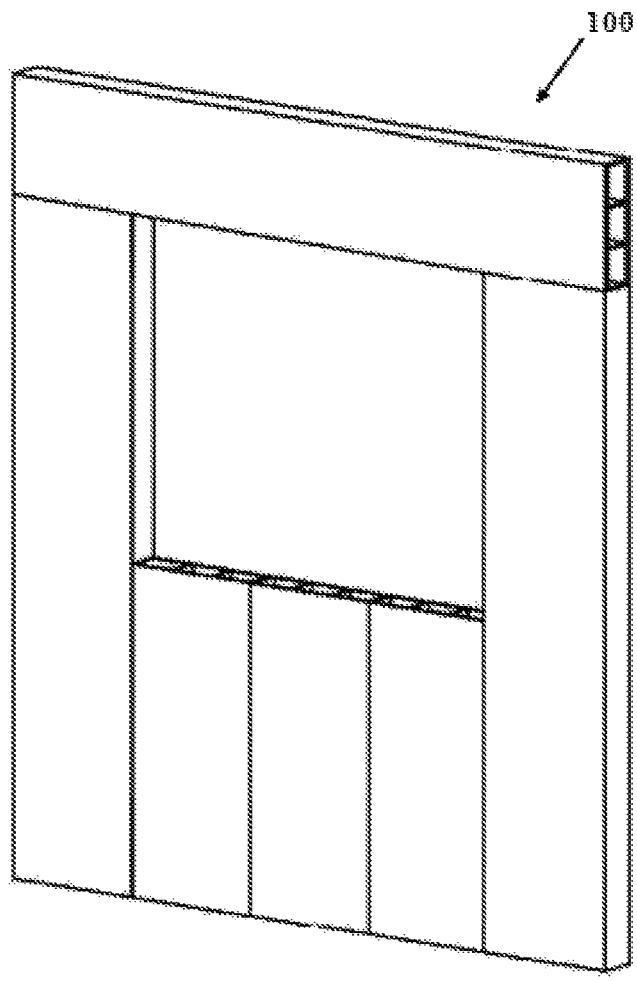
FIG. 3B illustrates a perspective view of a window space erected with a prefabricated mineral composite panel, according to an embodiment herein.

FIG. 3A illustrates a perspective view of a door space erected with a prefabricated mineral composite panel, according to an embodiment herein, while FIG. 3B illustrates a perspective view of a window space erected with a prefabricated mineral composite panel, according to an embodiment herein. With respect to FIG. 3A and FIG. 3B, a first set of punched galvanized iron angles are placed perpendicular to the ceiling (where the internal wall or lateral wall is going to be erected).

According to an embodiment herein, the prefabricated mineral composite panels 100 are sprayed with water. The wetted prefabricated mineral composite panels 100 are placed against the first set of galvanized iron angles. Further, a second set of galvanized iron angles are fitted in front of the prefabricated mineral composite panels 100. As a result, the prefabricated mineral composite panels 100 are placed in between the first and the second set of galvanized iron angles to ensure a proper placement of panels 100 in place.

According to an embodiment herein, the prefabricated mineral composite panels 100 are connected to one another by means of a special mineral adhesive. The prefabricated mineral composite panels 100 are wetted before placing against the galvanized iron angles to provide the required hydration between the panels 100 and the special mineral adhesive. The special mineral adhesive is applied between the prefabricated mineral composite panels 100 and is spread evenly. The same procedure is continued until the whole set of internal walls and the lateral walls are constructed.

Figure 4:
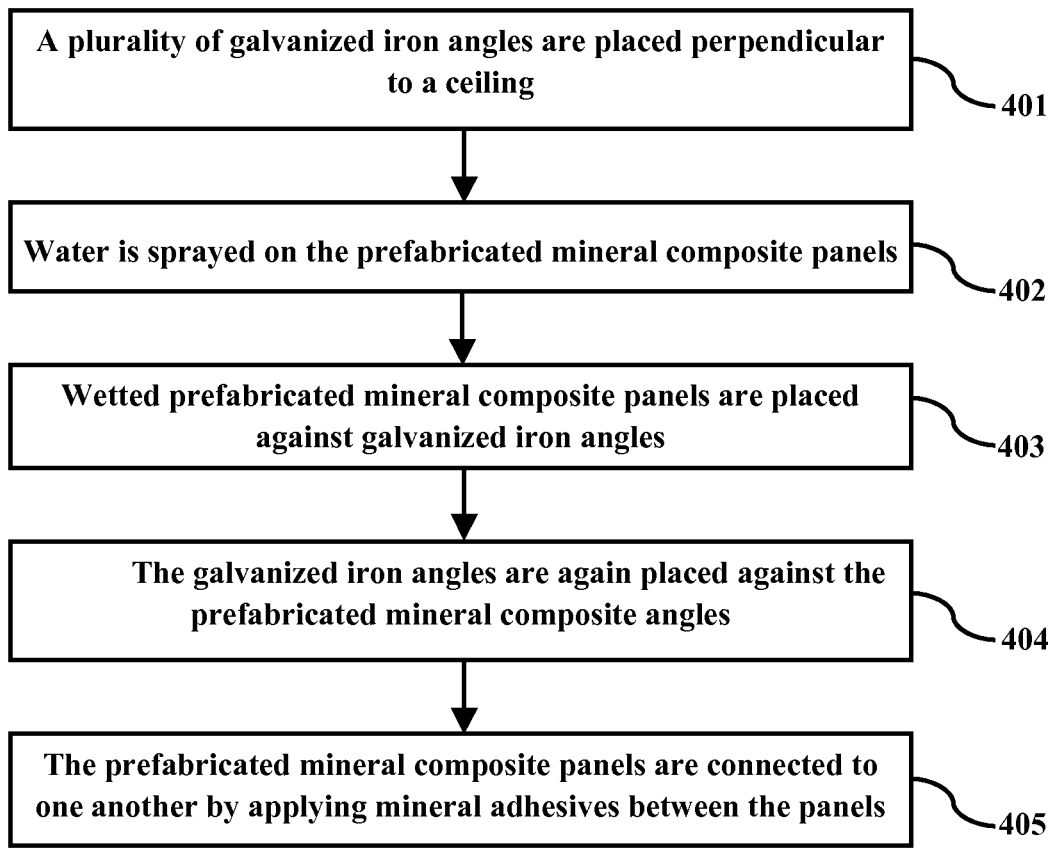
FIG. 4 illustrates a flow chart explaining a method for erecting a prefabricated mineral composite panel for constructing internal walls and lateral walls in a building, according to an embodiment herein.

FIG. 4 illustrates a flow chart explaining a method for erecting a prefabricated mineral composite panel for constructing the internal walls and the lateral walls in a building, according to an embodiment herein. With respect to FIG. 4, the method for erecting a prefabricated mineral composite panel for constructing the internal walls and the lateral walls in a building comprises the steps of: placing a plurality of galvanized iron angles perpendicular to a ceiling, spraying water on the prefabricated mineral composite panels, placing the wetted prefabricated mineral composite panels against the galvanized iron angles, placing the galvanized iron angles against the prefabricated mineral composite panels for ensuring a proper placement of prefabricated mineral composite panels in place, connecting a plurality of prefabricated mineral composite panels to one another and applying a mineral adhesive between the prefabricated mineral composite panels for fixing the prefabricated mineral composite panels to one another firmly.

According to an embodiment herein, a first set of punched galvanized iron angles is placed perpendicular to the ceiling where the internal wall or lateral wall is going to be erected (401). The prefabricated mineral composite panels are wetted with water (402). The wetted prefabricated mineral composite panels are placed against the first set of galvanized iron angles (403). Further, a second set of galvanized iron angles are fitted in front of the prefabricated mineral composite panels. As a result, the prefabricated mineral composite panels are placed in between the first and the second set of galvanized iron angles to ensure a proper placement of the prefabricated mineral composite panels in place (404). The prefabricated mineral composite panels are connected to one another by means of a special mineral adhesive (405). The prefabricated mineral composite panels are wetted before placing against the galvanized iron angles to provide the required hydration between the prefabricated mineral composite panels and the special mineral adhesive. The special mineral adhesive is applied between the prefabricated mineral composite panels and is spread evenly.

Figure 5A:
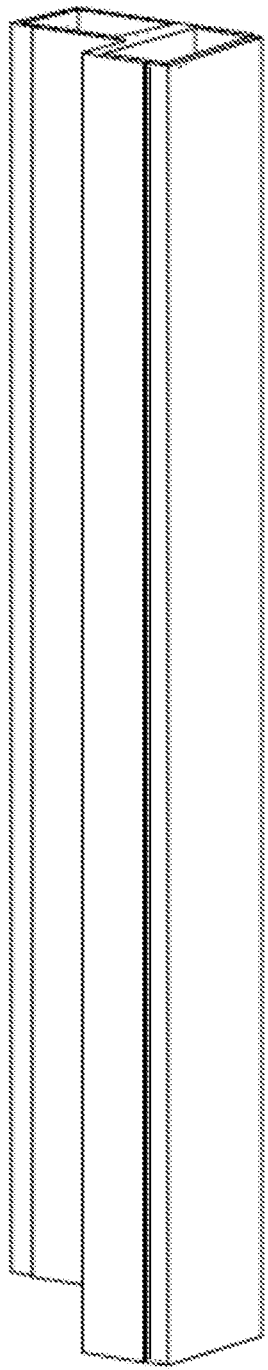
FIG. 5A illustrates a front perspective view of a prefabricated mineral composite panel for a corner wall, according to an embodiment herein.
Figure 5B:
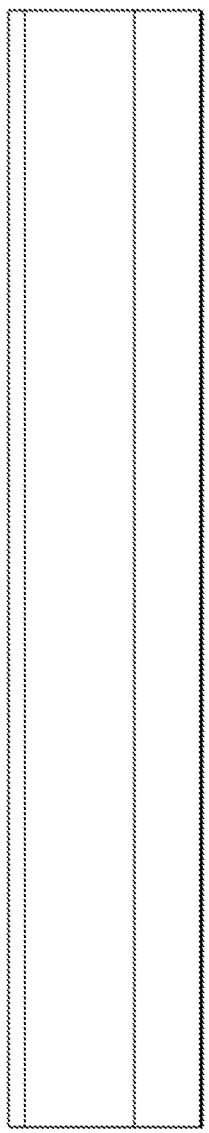
FIG. 5B illustrates a front side view of a prefabricated mineral composite panel for a corner wall, according to an embodiment herein.
Figure 5C:
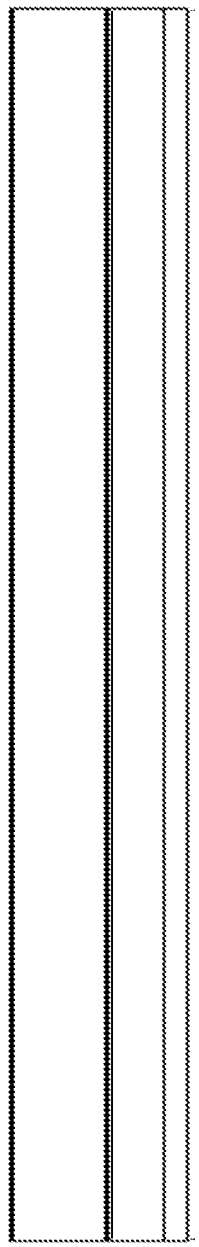
FIG. 5C illustrates a side view of a prefabricated mineral composite panel for a corner wall, according to an embodiment herein.
Figure 5D:
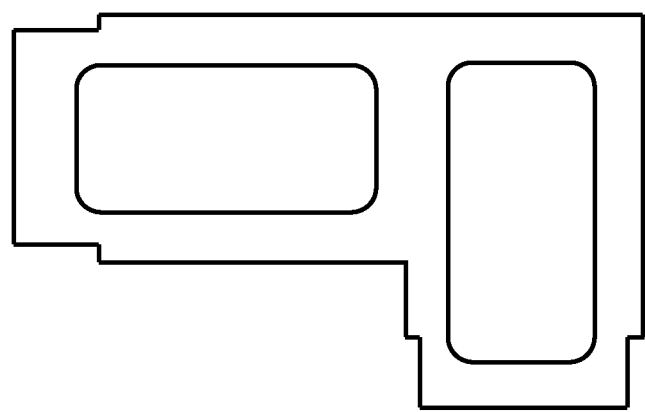
FIG. 5D illustrates a top side view of a prefabricated mineral composite panel for a corner wall, according to an embodiment herein.

FIG. 5A illustrates a front side perspective view of a prefabricated mineral composite panel for a corner wall according to an embodiment herein, FIG. 5B illustrates a front side view of a prefabricated mineral composite panel for a corner wall according to an embodiment herein, FIG. 5C illustrates a front view of a prefabricated mineral composite panel for a corner wall according to an embodiment herein and FIG. 5D illustrates a top side view of a prefabricated mineral composite panel for a corner wall according to an embodiment herein. With respect to FIG. 5A-FIG. 5D, a plurality of casts is prepared and is assembled together. A polypropylene plastic mesh or a fiber-glass mesh is fixed internally to the cast.

According to an embodiment herein, the internal mesh is used to reduce the weight of the prefabricated mineral composite panel and to enhance the compressive and building strength of the prefabricated mineral composite panel. Also, the prefabricated mineral composite panel does in no way lead to collapse or physical injuries in times of earthquakes due to the use of internal mesh.

According to an embodiment herein, a plurality of dry materials is mixed together in a dry form at a relevant mixing ratio for a specific period of time. A plurality of wet materials is added in proportion to the mixture of dry materials and is mixed together for a time period of 60 min. After the time period of 60 min, a dough-like mixture of prefabricated mineral composite comprising a mixture of dry materials and wet materials is obtained. The dough-like mixture is poured into the cast. A top surface of the cast is smoothened and flattened after the prefabricated mineral composite is completely poured into the cast.

According to an embodiment herein, after a time period of 30 min, the cast is disassembled from the semi-dried mineral composite panel. The semi-dried mineral composite panel is left free on pallets in a workshop space for a time period of 12 hours, so that the panel sets completely.

According to an embodiment herein, the semi-dried mineral composite panel is placed in a drying room for a time period of 12 hours, so that it dehydrates and becomes dry. The panel is dried at a room temperature of 50° Celsius in the drying room. After the time period of 12 hours, the dried prefabricated mineral composite panel is removed from the drying room. The prefabricated mineral composite panel is packaged and is ready for the erection process.

According to an embodiment herein, the plurality of dry materials comprises about 15% of industrial alpha gypsum, about 50% of industrial beta gypsum, about 20% of calcium carbonate, about 4% of sodium bentonite, about 10% of perlite, about 1% of sodium chloride and 0.05% of slender polypropylene fibers.

According to an embodiment herein, the plurality of wet materials comprises 95% of water, about 2% of late resin stuck and about 3% of waterproof resin.

According to an embodiment herein, the method further comprises the steps of placing a plurality of galvanized iron angles perpendicular to a ceiling, spraying water on a prefabricated mineral composite panel, placing a wetted prefabricated mineral composite panel against the galvanized iron angles, placing the galvanized iron angles against the panel for ensuring a proper placement of panel in place, connecting a plurality of panels to one another and applying a mineral adhesive between the panels for fixing the panels to one another firmly.

According to an embodiment herein, the prefabricated mineral composite for constructing the corner wall in the buildings comprises Calcium Sulphate Hemihydrate with a ratio of 70-75%, Calcium Carbonate with a ratio of 10-20%, Perlite with a ratio of 3-8%, Bentonite Sodium with a ratio of 0-3%, Talc with a ratio of 0-2%, Copolymer of Polyvinyl Alcohol with a ratio of 0-0.2%, and Casein with a ratio of 0-0.2.

According to an embodiment herein, Corner Panel that is being used in corners and angles. According to an embodiment herein, the dimensions and structure of the composite panel for a Corner Panel that is being used in corners and angles. This one is also flexible in height as the other panels of 12 cm and 8 cm thickness panels.

According to an embodiment herein, the prefabricated mineral composite panel for constructing the corner wall in the buildings comprises Calcium Sulphate Hemihydrate with a ratio of 70-75%, Calcium Carbonate with a ratio of 10-20%, Perlite with a ratio of 3-8%, Bentonite Sodium with a ratio of 0-3%, Talc with a ratio of 0-2%, Copolymer of Polyvinyl Alcohol with a ratio of 0-0.2%, and Casein with a ratio of 0-0.2.

The prefabricated mineral composite panel of the embodiments herein is completely water resistant. The prefabricated mineral composite panel is resistant against sound transfer, heat and fire. The panel is highly lightweight and reduces the structural and building weights. The mineral composite panel allows energy control and efficiency in buildings and reduces energy wastage. The prefabricated mineral composite panels are offered at reasonable price and the use of these prefabricated mineral composite panels speeds up the construction of internal walls and the lateral walls in the buildings. The mineral composite panel enhances the safety of building walls against fire and earthquake. The prefabricated mineral composite panel increases the acoustic and thermal resistance factors in the building walls.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. A method for erecting the prefabricated mineral composite panels, the method comprising the steps of:
   preparing and assembling a cast;

fixing a mesh in the cast;
pouring a prefabricated mineral composite into the cast;
smoothening and flattening a top surface of the cast;
disassembling the cast to withdraw a semi-dried prefabricated mineral composite panel;
placing the semi-dried prefabricated mineral composite panel in a drying room for drying the prefabricated mineral composite;
removing the dried prefabricated mineral composite panel from the drying room;
packaging the prefabricated mineral composite panel;
placing a plurality of galvanized iron angles perpendicular to a ceiling;
spraying water on a prefabricated mineral composite panel;
placing wetted prefabricated mineral composite panel against the galvanized iron angles;
placing the galvanized iron angles against the panel for ensuring a proper placement of panel in place;
connecting a plurality of panels to one another; and
applying a mineral adhesive between the panels for fixing the panels to one another firmly; and
wherein a plurality of prefabricated mineral composite panels are fixed together, and wherein the plurality of prefabricated mineral composite panels are fixed together to form an internal wall, a corner wall and a lateral wall in a building.

2. The method according to claim 1, wherein the prefabricated mineral composite panel is dried in the drying room at a temperature of 50° Celsius.

3. The method according to claim 1, wherein the mesh is a polypropylene plastic mesh.

4. The method according to claim 1, wherein the mesh is a fiber glass mesh.

5. The method according to claim 1, wherein the prefabricated mineral composite for constructing the lateral walls and the internal walls in the buildings comprising: a plurality of dry materials including: industrial alpha gypsum with a ratio of about 15%; industrial beta gypsum with a ratio of about 50%; calcium carbonate with a ratio of about 20%; sodium bentonite with a ratio of about 4%; perlite with a ratio of about 10%; sodium chloride with a ratio of about 1%; slender polypropylene fibers with a ratio of 0.05%; a plurality of wet materials including: water with a ratio of 95%; late resin stuck with a ratio of 2%; and waterproof resin with a ratio of 3%; wherein the plurality of dry materials are mixed together in dry form to form a mixture of dry materials and the plurality of wet materials are added to the mixture of dry materials and mixed for a specific period of time.

6. The method according to claim 1, wherein the prefabricated mineral composite for constructing the corner wall in the buildings comprising:

| | |
|---|---|
| Calcium Sulphate Hemihydrate | 70-75% |
| Calcium Carbonate | 10-20% |
| Perlite | 3-8% |
| Bentonite Sodium | 0-3% |
| Talc | 0-2% |
| Copolymer of Polyvinyl Alcohol | 0-0.2% |
| Casein | 0-0.2 |

7. The method according to claim 1, wherein the mineral composite are mixed together for a time period of 60 minutes.

* * * * *